United States Patent
Dash et al.

(10) Patent No.: US 11,520,762 B2
(45) Date of Patent: Dec. 6, 2022

(54) PERFORMING FINE-GRAINED QUESTION TYPE CLASSIFICATION

(71) Applicant: International Business Machines Corporation, Armonk, NY (US)

(72) Inventors: Sarthak Dash, Jersey City, NJ (US); Gaetano Rossiello, Brooklyn, NY (US); Alfio Massimiliano Gliozzo, Brooklyn, NY (US); Robert G. Farrell, Cornwall, NY (US); Bassem Makni, Bellevue, WA (US); Avirup Sil, Hopewell Junction, NY (US); Vittorio Castelli, Croton-on-Hudson, NY (US); Radu Florian, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 16/713,776

(22) Filed: Dec. 13, 2019

(65) Prior Publication Data
US 2021/0182258 A1 Jun. 17, 2021

(51) Int. Cl.
| G06F 16/00 | (2019.01) |
| G06F 16/22 | (2019.01) |
| G06F 16/2457 | (2019.01) |
| G06N 3/08 | (2006.01) |
| G06K 9/62 | (2022.01) |
| G06F 16/28 | (2019.01) |

(52) U.S. Cl.
CPC .... *G06F 16/2237* (2019.01); *G06F 16/24578* (2019.01); *G06F 16/285* (2019.01); *G06K 9/6256* (2013.01); *G06N 3/08* (2013.01)

(58) Field of Classification Search
None
See application file for complete search history.

(56) References Cited

U.S. PATENT DOCUMENTS

| 8,775,341 | B1 | 7/2014 | Commons |
| 9,378,273 | B2 | 6/2016 | Chu-Carroll et al. |
| 10,210,161 | B2 | 2/2019 | Yin |
| 10,304,444 | B2 * | 5/2019 | Mathias ............... G06F 16/3329 |
| 11,147,459 | B2 * | 10/2021 | Sobol ...................... H04W 4/80 |
| 11,210,306 | B2 * | 12/2021 | Steedman Henderson ................. G06N 3/08 |
| 11,373,088 | B2 * | 6/2022 | Bleiweiss ............ G06N 3/0445 |
| 2017/0278514 | A1 * | 9/2017 | Mathias ................ G06F 40/284 |
| 2017/0372200 | A1 * | 12/2017 | Chen .................... G06N 3/0445 |
| 2019/0206090 | A1 * | 7/2019 | Ray ....................... G06F 12/023 |
| 2019/0209022 | A1 * | 7/2019 | Sobol ................... A61B 5/0022 |
| 2020/0134461 | A1 * | 4/2020 | Chai .................... G06N 3/0635 |

(Continued)

OTHER PUBLICATIONS

Anonymous, "Finding fine-grained detector from trained deep learning models," IP.com Prior Art Database, Technical Disclosure No. IPCOM000242472D, Jul. 17, 2015, pp. 1-3.

(Continued)

*Primary Examiner* — Farhan M Syed
(74) *Attorney, Agent, or Firm* — Zilka-Kotab, P.C.

(57) ABSTRACT

A computer-implemented method according to one embodiment includes converting an input question into a vector form using trained word embeddings; constructing a type similarity matrix using a predetermined ontology; and determining a score for all possible types for the input question, based on the input question in vector form and the type similarity matrix.

16 Claims, 6 Drawing Sheets

(56) References Cited

U.S. PATENT DOCUMENTS

| | | | |
|---|---|---|---|
| 2021/0090694 A1* | 3/2021 | Colley | G16B 40/00 |
| 2021/0141798 A1* | 5/2021 | Steedman Henderson | G06N 3/0454 |
| 2021/0141799 A1* | 5/2021 | Steedman Henderson | G06F 16/24578 |
| 2022/0039673 A1* | 2/2022 | Sobol | G06N 20/00 |

OTHER PUBLICATIONS

Anonymous, "Cascade deep learning model training for visual analytics," IP.com Prior Art Database, Technical Disclosure No. IPCOM000245969D, dated Apr. 21, 2016, pp. 1-3.

Dubey et al., "Pairwise Confusion for Fine-Grained Visual Classification," European Conference on Computer Vision, 2018, pp. 1-17.

Abhishek et al., "Fine-Grained Entity Type Classification by Jointly Learning Representations and Label Embeddings," Proceedings of the 15th Conference of the European Chapter of the Association for Computational Linguistics, vol. 1, Long Papers, Apr. 3-7, 2017, pp. 797-807.

Madabushi et al., "Integrating Question Classification and Deep Learning for improved Answer Selection," Proceedings of the 27th International Conference on Computational Linguistics, Aug. 20-26, 2018, pp. 3283-3294.

Khoury, R., "Question Type Classification Using a Part-of-Speech Hierarchy," Conference on Autonomous and Intelligent Systems, 2011, pp. 212-221.

Lopez et al., "PowerAqua: supporting users in querying and exploring the Semantic Web," Semantic Word Journal, 2011, vol. 3, No. 3, 18 pages.

Zhou et al., "A C-LSTM Neural Network for Text Classification," arXiv, Nov. 30, 2015, 10 pages, retrieved from https://arxiv.org/abs/1511.08630.

Wang et al., "A Joint Model for Questioning Answering and Question Generation," arXiv, Jun. 5, 2017, 7 pages, retrieved from https://arxiv.org/abs/1706.01450.

Choi et al., "Ultra-Fine Entity Typing," arXiv, Jul. 13, 2018, 10 pages, retrieved from https://arxiv.org/abs/1807.04905.

Li et al., "Learning Question Classifiers," The 19th International Conference on Computational Linguistics, 2002, 7 pages, retrieved from https://www.aclweb.org/anthology/C02-1150/.

Squad, "SQuAD 2.0: The Stanford Question Answering Dataset," GitHub, Accessed on Dec. 10, 2019, 21 pages, retrieved from https://rajpurkar.github.io/SQuAD-explorer/.

* cited by examiner

PERFORMING FINE-GRAINED QUESTION TYPE CLASSIFICATION

BACKGROUND

The present invention relates to data classification, and more specifically, this invention relates to the classification of a question type.

Question and answer systems (Q/A systems) are a popular tool used to provide automated answer options to received questions. When determining possible answers to a received question, identifying a type of the received question may be valuable, as such type may be used to refine/rank provided automated answer options for the question. However, current solutions for determining type require manual annotation of question type, and only operate at a coarse training data granularity.

SUMMARY

A computer-implemented method according to one embodiment includes converting an input question into a vector form using trained word embeddings; constructing a type similarity matrix using a predetermined ontology; and determining a score for all possible types for the input question, based on the input question in vector form and the type similarity matrix.

According to another embodiment, a computer program product for performing fine-grained question type classification includes a computer readable storage medium having program instructions embodied therewith, where the computer readable storage medium is not a transitory signal per se, and where the program instructions are executable by a processor to cause the processor to perform a method including converting, by the processor, an input question into a vector form using trained word embeddings; constructing, by the processor, a type similarity matrix using a predetermined ontology; and determining, by the processor, a score for all possible types for the input question, based on the input question in vector form and the type similarity matrix.

According to another embodiment, a system includes a processor; and logic integrated with the processor, executable by the processor, or integrated with and executable by the processor, where the logic is configured to convert an input question into a vector form using trained word embeddings; construct a type similarity matrix using a predetermined ontology; and determine a score for all possible types for the input question, based on the input question in vector form and the type similarity matrix.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing fine-grained question type classification.

In one general embodiment, a computer-implemented method includes converting an input question into a vector form using trained word embeddings; constructing a type similarity matrix using a predetermined ontology; and determining a score for all possible types for the input question, based on the input question in vector form and the type similarity matrix.

In another general embodiment, a computer program product for performing fine-grained question type classification includes a computer readable storage medium having program instructions embodied therewith, where the computer readable storage medium is not a transitory signal per se, and where the program instructions are executable by a processor to cause the processor to perform a method including converting, by the processor, an input question into a vector form using trained word embeddings; constructing, by the processor, a type similarity matrix using a predetermined ontology; and determining, by the processor, a score for all possible types for the input question, based on the input question in vector form and the type similarity matrix.

In another general embodiment, a system includes a processor; and logic integrated with the processor, executable by the processor, or integrated with and executable by the processor, where the logic is configured to convert an input question into a vector form using trained word embeddings; construct a type similarity matrix using a predetermined ontology; and determine a score for all possible types for the input question, based on the input question in vector form and the type similarity matrix.

Figure 1:
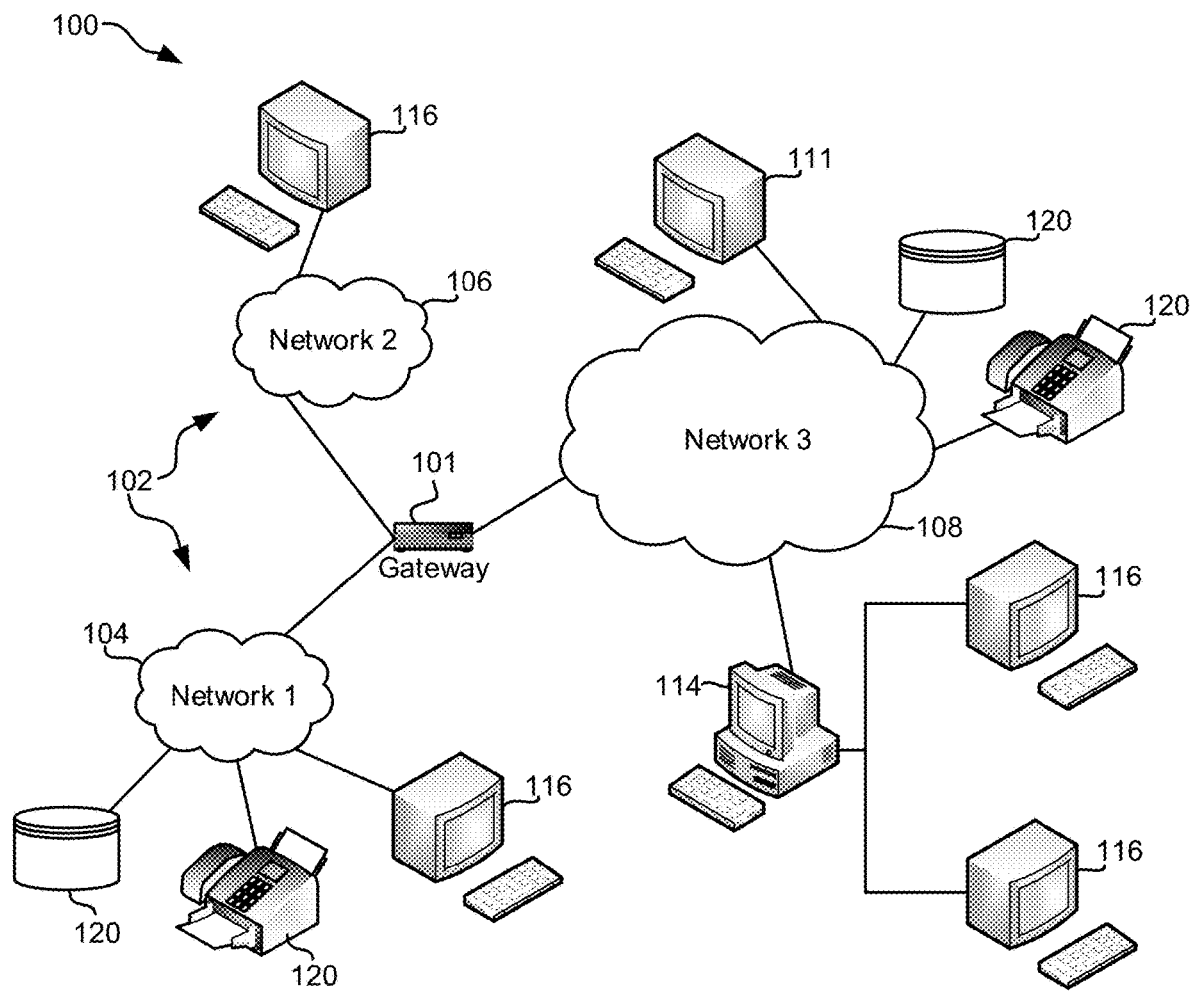
FIG. 1 illustrates a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
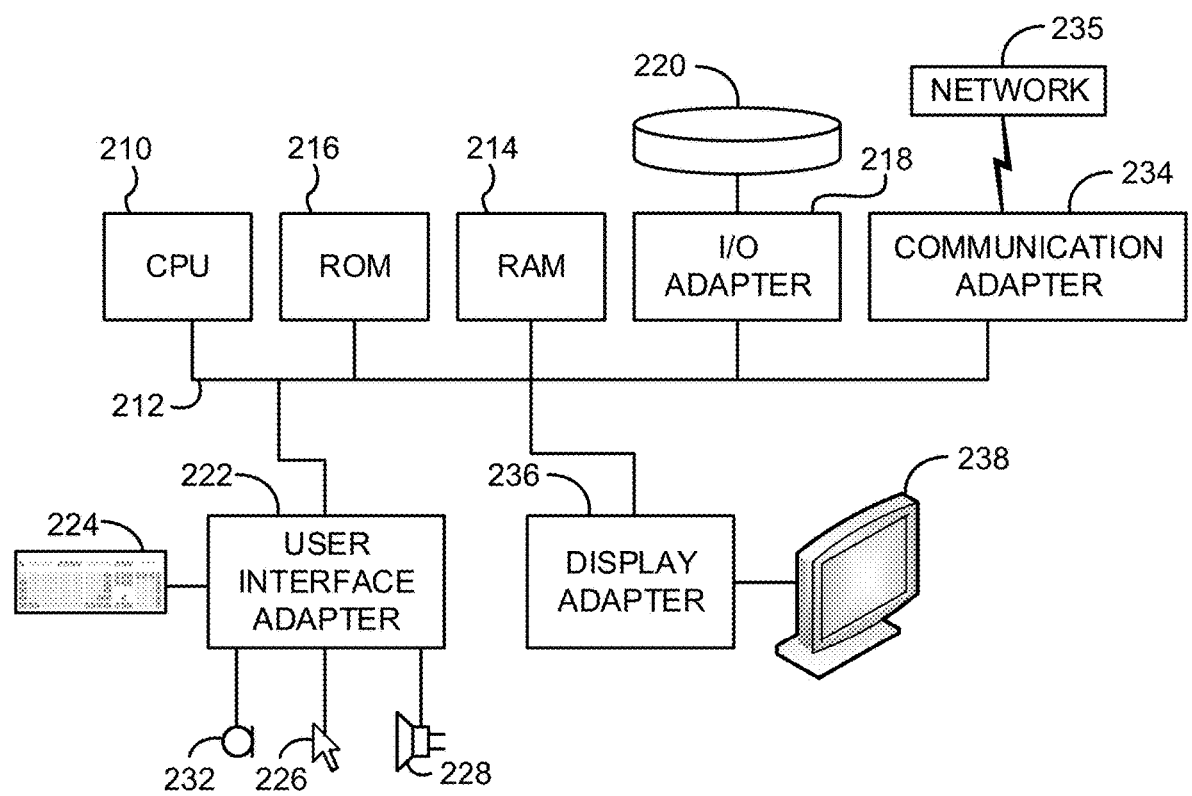
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
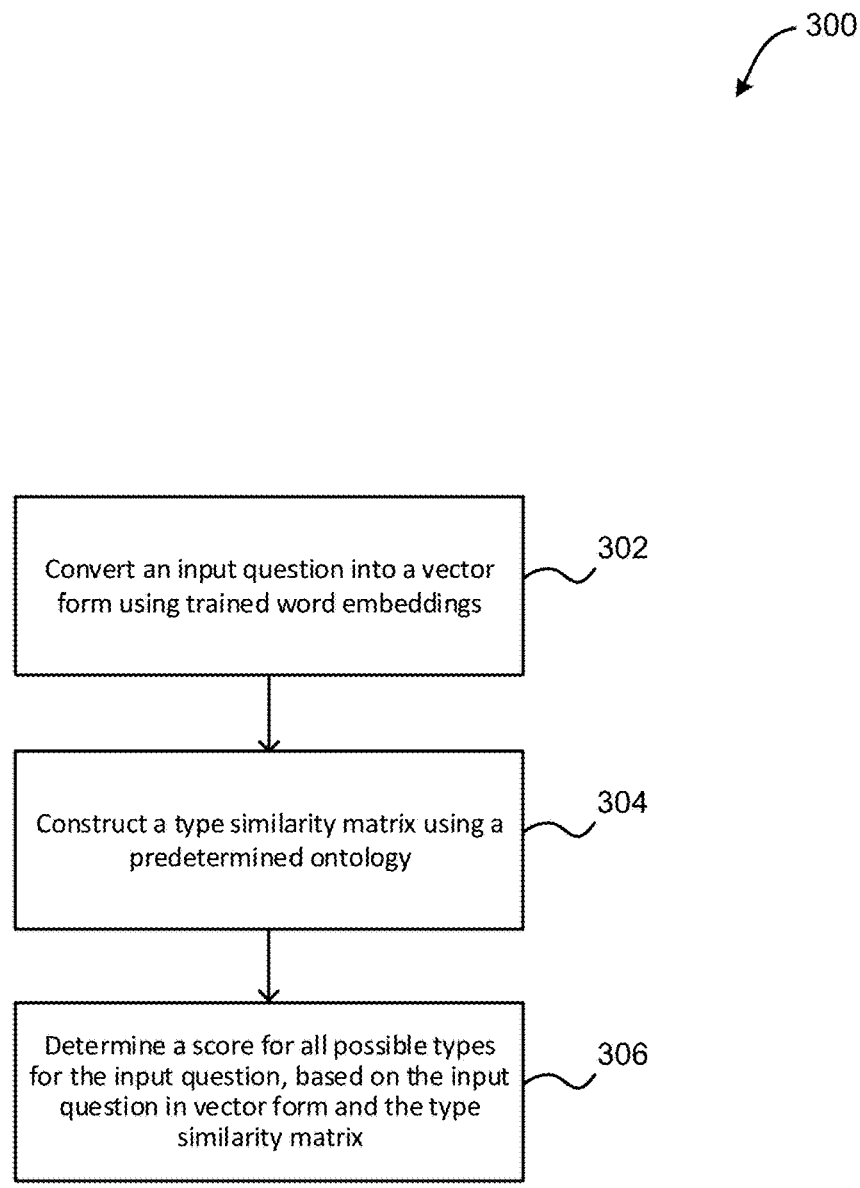
FIG. 3 illustrates a method for performing fine-grained question type classification, in accordance with one embodiment of the present invention.

Now referring to FIG. 3, a flowchart of a method 300 is shown according to one embodiment. The method 300 may be performed in accordance with the present invention in any of the environments depicted in FIGS. 1-2 and 5-6, among others, in various embodiments. Of course, greater or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where an input question is converted into a vector form using trained word embeddings. In one embodiment, the input question may include a text string (e.g., "who is the CEO of company X?"). In another embodiment, the input question may include a question for which an answer is requested.

Additionally, in one embodiment, the input question may include a training question-type pair (e.g., an (instance, label) pair, etc.). For example, the input question may have an associated predetermined list of types for which the input question is associated. In yet another example, the input question may have an associated answer. For instance, the input question may be part of a question/answer pair included within training data for a Question-Answering task.

Further, in one embodiment, the input question may initially be received at a neural network classifier that has been trained on a Question Type prediction task. In another embodiment, this neural network classifier may be part of a question/answer (Q/A) system. In yet another embodiment, the input question may be converted into a vector by a recurrent neural network (RNN) such as a bidirectional long short-term memory (LSTM), etc.

Further still, in one embodiment, the input question may be received in vector form at an attenuation layer by an additional strategy, within a neural network classifier used for training a Question-Type prediction system. In this way, the input question may be converted into a vector form usable by the attenuation layer.

Also, method 300 may proceed with operation 304, where a type similarity matrix is constructed using a predetermined ontology. In one embodiment, the type similarity matrix may be constructed at the attenuation layer within the neural network classifier used for training a Question-Type prediction system.

In addition, in one embodiment, the type similarity matrix may be created using a predetermined ontology. For example, a predetermined ontology may include a predetermined grouping of data with associated definitions (e.g., Wikidata, DBPedia, Yago etc.). For instance, the predetermined ontology may include a graph of labeled nodes (representing entities) and associated types that is used for classification purposes.

Furthermore, in one embodiment, labeled nodes within the predetermined ontology may be used to build a type similarity matrix. In another embodiment, the type similarity matrix may consist of a series of vectors (one vector per type) within a Euclidean vector space.

Further still, in one embodiment, the proximity of vectors (representing types) within the Euclidean vector space may be used to calculate a similarity score within those vectors. For example, two types X and Y having a greater number of entities in common from a predetermined ontology (observed by a simple lookup operation on the predetermined ontology) have vectors closer together within the Euclidean vector space (and therefore have a greater cosine similarity), when compared to types having a lesser number of entities in common. This requirement is satisfied due to the use of low rank decomposition methods like SVD on the co-occurrence matrix of types compared to instances. A co-occurrence matrix is a matrix wherein the cell (i,j) equals one if type i contains entity j, and is zero otherwise. Other exemplary methods to obtain similarity between types include Jacquard similarity etc. In another example, vectors closer together within the Euclidean vector space may therefore have a greater similarity when compared to vectors that are further apart within the Euclidean vector space.

In this way, nodes within the predetermined ontology may be restructured and reformatted into a series of vectors in Euclidean vector space (e.g., to build a type similarity matrix), where each vector conveys a predetermined type within the ontology, and where location of vectors within the Euclidean vector space can be used to build a similarity score between the associated types within the predetermined ontology.

Also, in one embodiment, the type similarity matrix may be created by constructing a co-occurrence matrix, and then applying low rank decomposition methods such as singular value decomposition (SVD), auto-encoders, etc.

Additionally, method 300 may proceed with operation 306, where a score for all possible types for the input question is determined based on the input question in vector form and the type similarity matrix. In one embodiment, the attenuation layer within the neural network classifier may perform matrix multiplication between the input question in vector form and the type similarity matrix to determine the vector of possible types for the input question. In another embodiment, the vector of possible types for the input question has a predetermined number of dimensions that is equivalent to the number of possible types for the input question.

Further, in one embodiment, vector of possible types for the input question may be refined, utilizing a list of potential types for training data derived from the predetermined ontology. In another embodiment, the training data may include question/answer pairs (e.g., a question string and associated answer string, etc.) used to train the neural network classifier, where the type of the answer string may be looked up from the ontology, and may be assigned to the question as its label. In yet another embodiment, the predetermined ontology includes a graph of labeled nodes (representing entities) and associated types.

Further still, in one embodiment, the training data comprising of question-answer pairs can be used together with a predetermined ontology to determine the list of potential types for each input query question. For example, for each answer within the training data, a list of probable types for the answer may be extracted from the predetermined ontology. This may result in a mapping between each input question of the training data and a list of potential types from the predetermined ontology. In another embodiment, these mappings may be combined to create a subset of all existing types within the predetermined ontology that have at least a predetermined amount of relevance to the question/answer pairs of the training data (e.g., the list of potential types for training data). In another embodiment, a list of question-answer pairs may be compared to a predetermined ontology to determine a list of potential types for each answer within each question-answer pair, to construct a list of question-type pairs that act as training data.

Also, in one embodiment, a comparison strategy between the system predicted vector of scores for all possible types for the input question and the list of potential types present in the training data for the corresponding question may be encoded (e.g., utilizing sampled softmax operations, weighted negative log-likelihood (NLL) operations, etc.). In another embodiment, this encoded difference may represent the difference between the system's current predictions and desired system predictions. Based on this difference, the training may include taking error-correcting steps to minimize this difference.

In addition, in one embodiment, the refined vector of possible types for the input question may then be returned. In another embodiment, each of the possible types within the refined vector may have an associated similarity score.

Furthermore, in one embodiment, the measure of a scalar loss value obtained as a function of the system's prediction of possible types and the true label of possible types may be back-propagated through the neural network classifier during the training phase. For example, the refined vector of possible types for the input question may be compared to a given vector of possible types for the input question (e.g., where the given vector was provided as part of the training data for the input question) to determine how different the system prediction is, as compared to the given vector of type's scores in the training data. In another embodiment, the loss value obtained via the neural network's prediction when compared to the true labels is then minimized by adjusting the network's parameters.

Also, in one embodiment, a difference between the vector of possible types for the input question as predicted by the system and the list of potential types as provided by the training data may be encoded by utilizing a loss function such as a weighted negative log-likelihood (NLL) operation. In another embodiment, the difference may be minimized during a training phase of a neural network which modifies parameters of the neural network. In yet another embodiment, a loss value for the input question may be back-propagated through the neural network.

In this way, a reliance on manual annotations may be eliminated during training of the neural network classifier.

Additionally, similarity between types within an ontology may be encoded, and may be used to improve a relevance of determined types for an input question. These improvements may in turn improve a performance of a neural network classifier, which may improve a performance of one or more hardware computing devices implementing such neural network classifier (e.g., by reducing an amount of necessary processing utilization and power consumption during classification, etc.).

Figure 4:
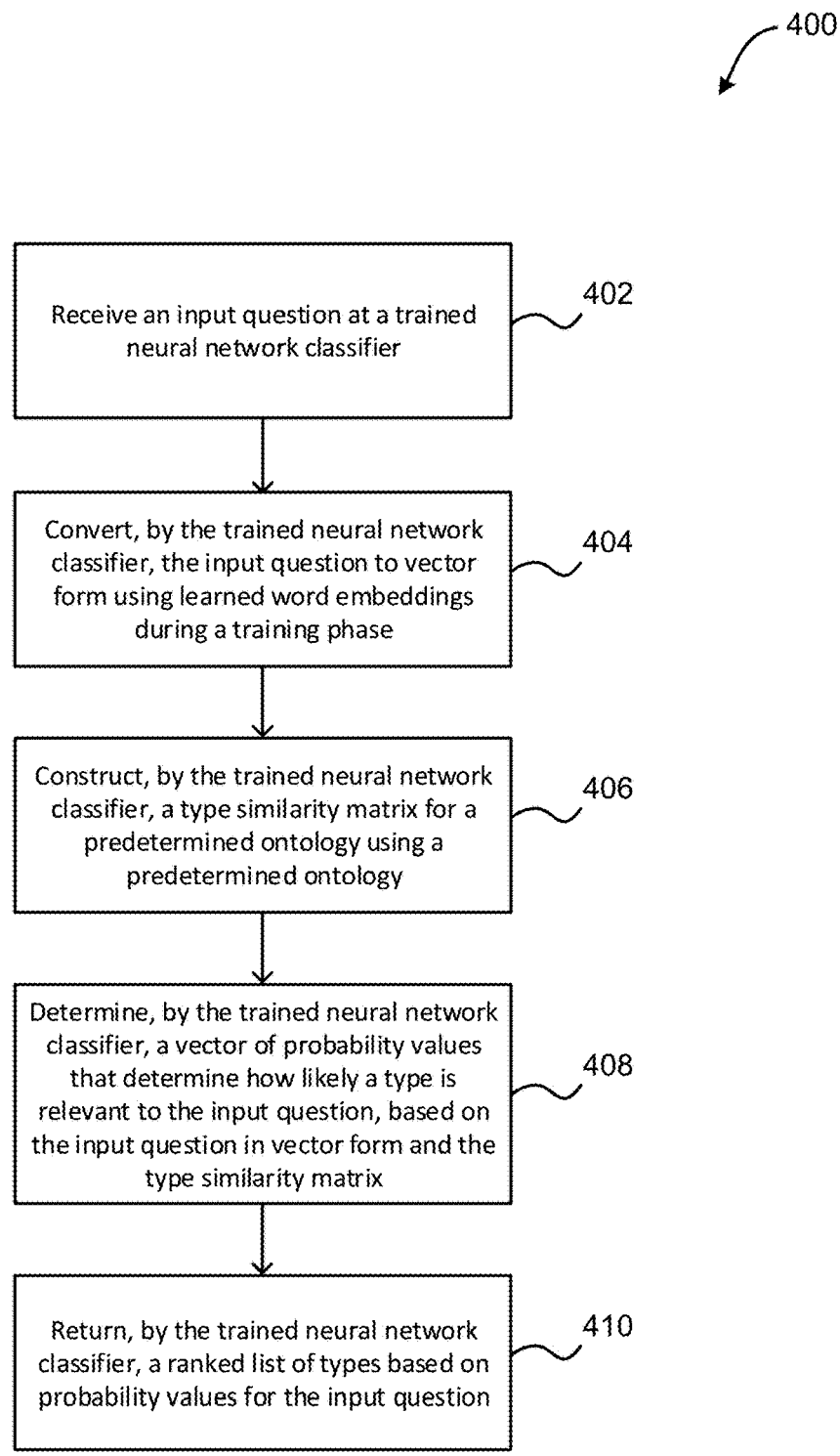
FIG. 4 illustrates a method for performing fine-grained question type classification using a trained neural network classifier, in accordance with one embodiment of the present invention.

Now referring to FIG. 4, a flowchart of a method 400 for performing fine-grained question type classification using a trained neural network classifier is shown according to one embodiment. The method 400 may be performed in accordance with the present invention in any of the environments depicted in FIGS. 1-3 and 5-6, among others, in various embodiments. Of course, greater or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where an input question is received at a trained neural network classifier. Additionally, method 400 may proceed with operation 404, where the input question is converted to vector form using learned word embeddings during a training phase by the trained neural network classifier. Further, method 400 may proceed with operation 406, where a type similarity matrix is constructed using a predetermined ontology.

Further still, method 400 may proceed with operation 408, where a vector of probability values that determine how likely a type is relevant to the input question is determined by the trained neural network classifier, based on the input question in vector form and the type similarity matrix.

In addition, method 400 may proceed with operation 410, where a ranked list of types based on probability values for the input question is returned by the trained neural network classifier. In one embodiment, each of the possible types within the refined vector may have an associated likelihood score (e.g. how likely any given type (from the list of all possible types) is to be associated with the input query question instance).

Furthermore, in one embodiment, the refined vector of possible types for the input question may be used to improve a performance of a question/answer (Q/A) system. For example, a list of possible answers may be determined for the input question. In another example, the types of those answers may be determined, and may be compared to the possible types for the input question.

Further still, in one embodiment, the types of the answers may be ranked based on the comparison. For example, answers having a type matching one or more of the possible types for the input question may be ranked higher than answers that do not have a type matching one or more of the possible types for the input question. This may improve an accuracy/performance of the Q/A system.

Figure 5:
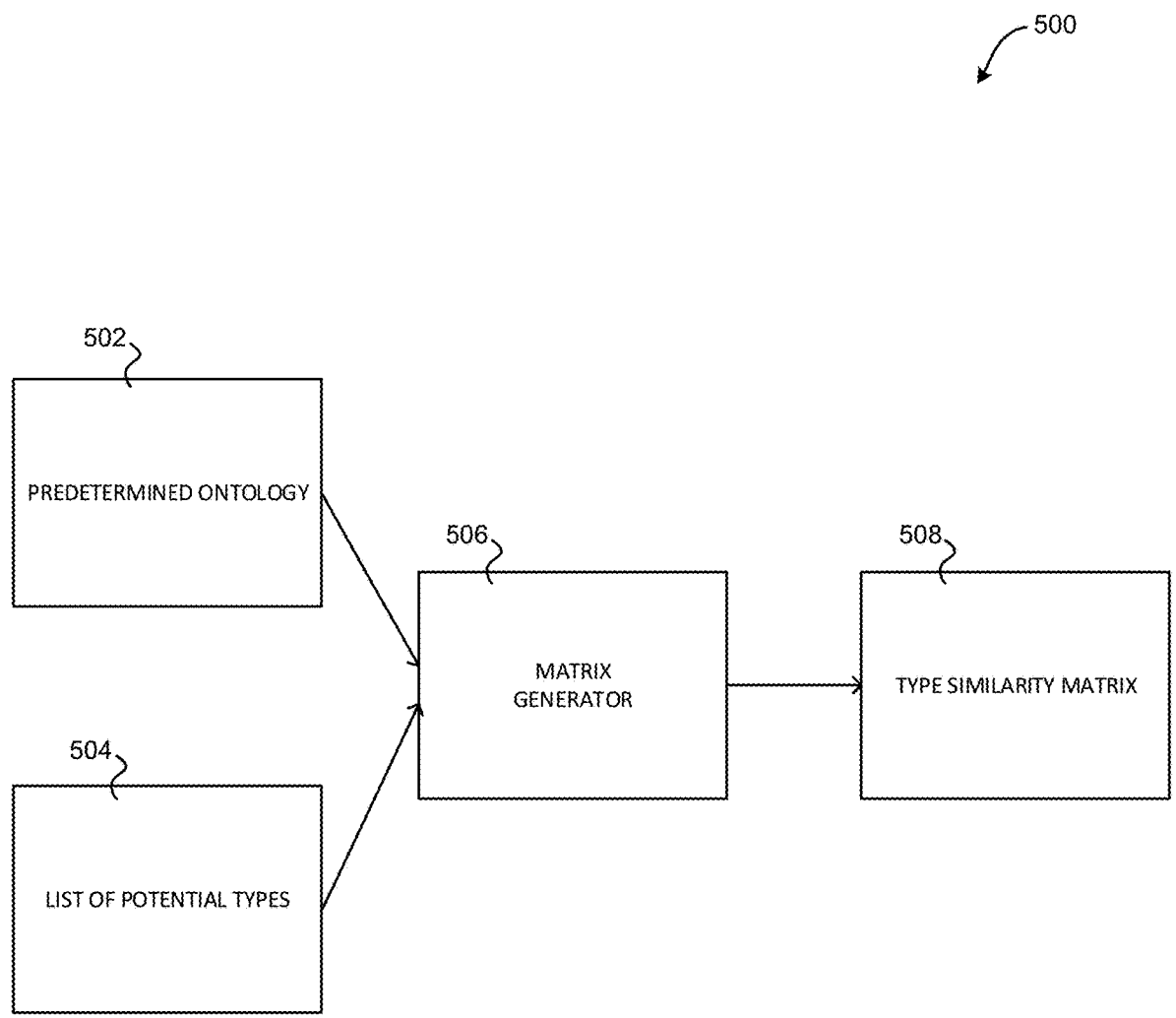
FIG. 5 illustrates an exemplary type similarity creation environment, in accordance with one embodiment of the present invention.

FIG. 5 illustrates an exemplary type similarity creation environment 500, according to one exemplary embodiment. As shown, a predetermined ontology 502 and a list of potential types 504 are input into a matrix generator 506 to create a type similarity matrix 508.

Additionally, in one embodiment, the predetermined ontology 502 includes a list of types t and associated resources r. In another embodiment, the resources may include entities represented within the ontology. In yet another embodiment, the list of potential types 504 may include a list of considered types in a vocabulary (e.g., a list of all potential types for a predetermined set of question/answer pairs, etc.).

Further, in one embodiment, the predetermined ontology may include a graph of labeled nodes (representing entities) and associated types that is used for classification purposes, and the labeled nodes within the predetermined ontology may be used by the matrix generator 506 to create the type similarity matrix 508. Additionally, the matrix generator 506 may restrict the type similarity matrix 508 to only include types from the list of potential types 504.

Figure 6:
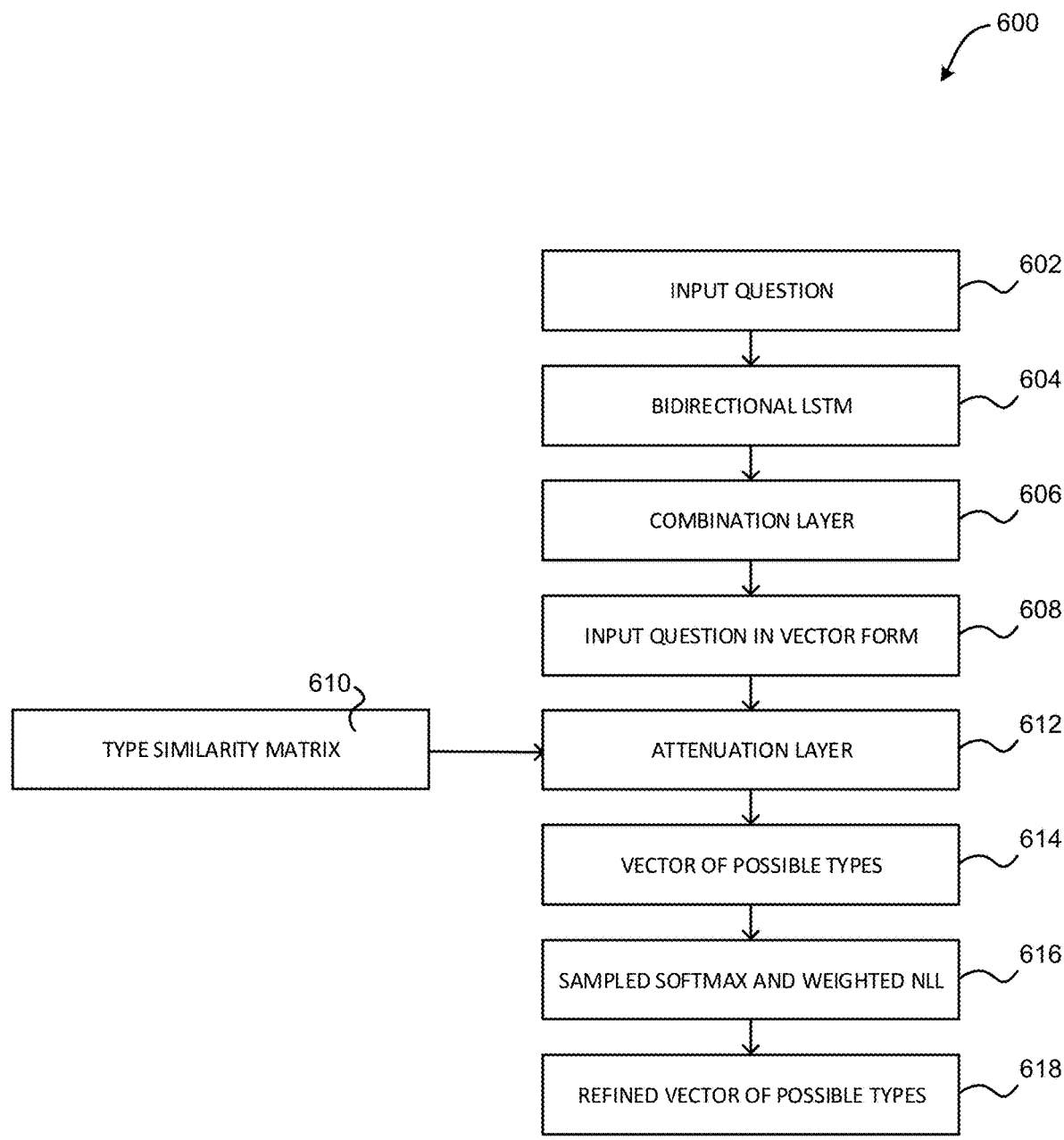
FIG. 6 illustrates an exemplary neural network classifier during training, in accordance with one embodiment of the present invention.

FIG. 6 illustrates an exemplary neural network classifier 600 during training, according to one exemplary embodiment. As shown, an input question 602 is received and transformed by a bidirectional LSTM 604 and a combination layer 606 into a vector form 608. Additionally, the vector form 608 and a type similarity matrix 610 (such as the type similarity matrix 508 from FIG. 5, etc.) are sent to an attenuation layer 612, which determines a vector of possible types 614 for the input question 602.

Additionally, the vector of possible types 614 as determined by the neural network is compared against another vector of true types (obtained from the training data). In another embodiment, this comparison function can be a sampled soft-max operation followed by a weighted NLL, which yields a scalar loss value as a measure of the difference. This loss value is then minimized, which yields refined plausibility scores for types, for a given query question.

Neural Network-Based Fine-Grained Question Type Classification on Overlapping Types In one embodiment, a question may be classified into a category that indicates the type of answer needed. The answer extraction process for Q/A systems may therefore rely on finding the correct question type. Question types may be selected from a domain taxonomy/graph (e.g., a predetermined ontology). However, existing approaches do not use the similarities of the domain graph types to classify the question.

Additionally, in one embodiment, a mapping may be learned between a given question and a type/class within a domain graph of classes. In another embodiment, resources (instances) and their associated types (classes) may be used from semantic web taxonomies (graphs), which eliminates a need for additional manual annotation.

This approach may be able to handle coarse-grained types (e.g. Museum) and fine-grained types (e.g. MuseumsInSpain) simultaneously. Rather than treating taxonomic types as independent, this approach encodes the similarity between pairs of types using a list of participating resources per type. This improves the overall performance of the Question-Type classification system.

Further, in one embodiment, a classifier may be trained that tags an answer for a given question, answer pair (within a QA system) with one or more types present in one or more semantic web taxonomies by a simple lookup, without using any manual annotations. The similarity between types (e.g., classes in a classification task) may be encoded as a type embedding representation using known associations between resources and types in a domain graph (e.g., a semantic web, a predetermined ontology, etc.). This type embedding representation may be used to attenuate the contribution of the question type representation to the predicted classification result. For example, this attenuation operation can be encoded as a neural network layer within the overall architecture for question type classification task.

Further still, in one embodiment, a bi-directional LSTM may be used to encode the question sentence. Additionally, the output at the intermediate layers may be combined (e.g., using attention, etc.) to form a question vector $Q_i$. Also, a type embedding matrix T for each considered type t may be initialized.

In addition, in one embodiment, the type t is obtained from one or more taxonomies in a domain graph. In another embodiment, mappings between type t and resource r in the domain graph may be used to construct the initial type representations. This may be performed using a co-occurrence matrix M between types t (x-axis) and resources r (y-axis) and employing low-rank decomposition methods such as SVD, auto-encoders, etc on top of the co-occurrence matrix M. In another embodiment, for a particular type t, a list of resources r may be obtained, and pre-trained embeddings may be used for all the resources using an aggregation strategy in order to construct an embedding for the type t.

Furthermore, in one embodiment, in the attenuation layer, the question vector $Q_i$ is then multiplied with the type Matrix T containing embeddings for types. Pre-initializing the type matrix T using resources from the domain graph ensures that the types in T are not considered to be independent. This holds since the types come from a taxonomy and hence are related. Further still, it may be ensured that related types $t_i$ and $t_j$ have similar list of resources, and therefore have similar initial embeddings. As a result, given a question vector $Q_k$, related types $t_i$ and $t_j$ produce similar scores (unlike the case if they were assumed to be independent classes).

Also, a sampled soft max approach may be used, along with a weighted negative log-likelihood loss function, as the final layer in the neural network classifier, in order to compute how well is the system performing against true labels in the training data.

Given a question, a classifier may obtain a fine-grained type for the correct answer (which is unknown at test time). Knowledge from the semantic web (extracted in an automatic fashion) may be used to generate weak-supervision based training data for building the classifier that tackles the task.

Since the list of types (classes) within the type-vocabulary are not independent of one-another i.e. they are related via the taxonomy, this relatedness is introduced within the classifier by (1) first pre-initializing the type representations using the knowledge present in the taxonomy, and (2) multiplying this type matrix with the final layer of scores within the network. This multiplication operation becomes part of the overall network. This way, if two types are similar then both of them will have similar scores for a given question.

For training purposes, given a list of correct [question Q, answer A] pairs, the dataset is prepared:

1. Given a list of [question Q, answer A] pairs for training, a ranked list of types T is generated for the given answer. An updated dataset is then constructed by considering the question Q and the ranked type-list T together as a training instance.

2. Step 1 is repeated for all of the original [question Q, answer A] training pairs. On the completion of this step, the updated dataset is obtained for Question Type classifications.

The updated dataset is then pre-processed:

1. For each question in training, a ranked list of possible types for the correct answer is obtained. This question, type-list becomes a single training instance for the invention classifier.

2. A fixed number of types from amongst all types obtained in previous step are chosen as the type-vocabulary. One of the ways this number can be chosen is via frequency (e.g., by choosing a top k frequent types as the type-vocabulary).

3. For training instances whose types are not present in this type-vocabulary, the taxonomy graph is traversed (via the is-a relations) to find the first super-type (that exists within the type-vocabulary) that subsumes the type in the instance. This step is repeated for all the missing types in this training instance, to obtain an updated list of types L for the question Q. Having done this, this training instance is set as the tuple (Q, L). Note that as a result of this step, all the types in L are present in the type-vocabulary.

4. At the end of step 3, a list of training instances is obtained, wherein each instance consists of a question and a ranked list (with scores) of possible types.

Question Type classification training is then performed:

1. A classifier is trained that considers a question as an input and produces a list of scores, one per type. Note that this list of scores is finite-dimensional (e.g., having a number of dimensions equaling the size of the type-vocabulary).

2. Therefore, a type-embedding matrix (i.e. a representation of types) is constructed which encodes a relative similarity between different types in terms of their representations. For example, a type—resource matrix may be constructed, wherein each row consists of resources (URIs) of the given type. A dimensionality reduction technique may be used to get dense vectors for each row. In another example, graph embeddings may be used by considering the taxonomy as a graph structure.

3. The type-embedding matrix is multiplied with the list of scores produced by the classifier (at the penultimate layer). This way, if two types are related, then they will have similar scores for a given question.

4. As the final layer, a negative log-likelihood loss is computed between the current classifier scores and the scores provided in the earlier pre-processing step.

5. This loss value is then minimized, and the training continues until convergence.

For Inferencing, the given question is fed through one forward pass of the classifier, and a ranked list of produced types (along with scores) are then returned as output.

In one embodiment, a method for unsupervised classification of a query into a plurality of information need types includes the steps of automatically extracting a collection of information need types from a knowledge base (or a domain graph), automatically identifying a collection of resources in the knowledge base for each of said extracted information need types, automatically computing a match score between said query to each said collection of resources for each of said extracted information need types, sorting said extracted information need types according to said match score, and returning at least one of said sorted information need types having the highest scores.

In another embodiment, extracting the collection of information need types from a knowledge base further includes selecting a corpus of queries with correct answers, using weak supervision to perform type induction and produce a plurality of types for each said answer, and producing a final list of types by retaining said types with the highest frequency in the corpus.

In yet another embodiment, candidate answers may be re-ranked. In yet another embodiment, the candidate answer reranking further includes producing a plurality of candidate answers for the query, extracting a plurality of types for each of the candidate answers, computing a match score between the plurality of types and the at least one information need types, and reranking the candidate answers using the match score.

In still another embodiment, the match score may be trained using distant supervision from a taxonomy. For example, a subset of information need types are used for training during the distant supervision. In another embodiment, if a query type is not found during the match step then a more general type is found in the taxonomy.

In another embodiment, the type induction may be performed with a dimension reduction technique between the types and resources (e.g., using SVD, autoencoders, etc.). In another embodiment, the type induction may be performed using a distance between types using embeddings of the resource labels, where a label is a text string associated with the resource. In yet another embodiment, a match score may be created in an attenuation layer of a neural network that combines the intermediate layer of a neural network representation of the query with the type matrix.

In one embodiment, a method for unsupervised classification of a query into a plurality of information need types includes automatically extracting a collection of information need types from a knowledge base, automatically identifying a collection of resources in the knowledge base for each of the extracted information need types, automatically computing a match score between the query to each of the collection of resources for each of the extracted information need types, sorting the extracted information need types according to the match score, and returning at least one of the sorted information need types having the highest scores.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
converting, by a neural network, an input question into a vector form using trained word embeddings;
constructing, by the neural network, a type similarity matrix using a predetermined ontology;
performing, by the neural network, matrix multiplication between the input question in vector form and the type similarity matrix to determine a plurality of possible types for the input question; and
scoring, by the neural network, each of the plurality of possible types for the input question to create a ranked list of possible types for the input question,
wherein the predetermined ontology includes a plurality of labeled nodes representing entities and their associated types,
wherein the labeled nodes within the predetermined ontology are restructured and reformatted into a series of vectors in Euclidean vector space to construct the type similarity matrix,
wherein each vector within the series of vectors conveys a predetermined type within the predetermined ontology,
wherein a location of each vector within the Euclidean vector space is used to determine a similarity score between the associated types of the labeled nodes within the predetermined ontology,
wherein the neural network performs matrix multiplication between the input question in vector form and the type similarity matrix to determine a plurality of possible types for the input question, and
wherein the plurality of possible types for the input question is refined utilizing a list of potential types for training data derived from the predetermined ontology.

2. The computer-implemented method of claim 1, wherein the input question is converted into a vector by a bidirectional long short-term memory (LSTM) and a combination layer.

3. The computer-implemented method of claim 1, wherein:
the input question includes a text string, and
the input question is converted into the vector form by a recurrent neural network (RNN).

4. The computer-implemented method of claim 1, wherein each of a plurality of vectors are created within a Euclidean vector space to represent an associated type within the predetermined ontology, where a proximity of the vectors within the Euclidean vector space is associated with a similarity of the vectors.

5. The computer-implemented method of claim 1, wherein the type similarity matrix is created utilizing a low rank decomposition method such as SVD on top of a co-occurrence matrix.

6. The computer-implemented method of claim 1, wherein:
the neural network is trained utilizing a plurality of question/answer pairs, wherein each of the question/answer pairs includes a question string and an associated answer string, and
for each of the plurality of question/answer pairs, a type of the associated answer string is determined from the predetermined ontology and is assigned to the question string as its label to create a list of question/type pairs.

7. The computer-implemented method of claim 1, wherein:
the input question includes a text string that is converted into the vector form by a recurrent neural network (RNN).

8. The computer-implemented method of claim 1, further comprising:
encoding a difference between a vector of possible types for the input question as predicted by a system and a list of potential types as provided by training data by utilizing a loss function such as a weighted negative log-likelihood (NLL) operation; and
minimizing the difference during a training phase of a neural network which modifies parameters of the neural network.

9. The computer-implemented method of claim 8, further comprising back-propagating a loss value for the input question through the neural network.

10. A computer program product comprising one or more computer readable storage media, and program instructions collectively stored on the one or more computer readable storage media, the program instructions comprising instructions configured to cause one or more processors to perform a method comprising:
converting, by a neural network utilizing the one or more processors, an input question into a vector form using trained word embeddings;
constructing, by the neural network utilizing the one or more processors, a type similarity matrix using a predetermined ontology;
performing, by the neural network utilizing the one or more processors, matrix multiplication between the input question in vector form and the type similarity matrix to determine a plurality of possible types for the input question; and
scoring, by the neural network utilizing the one or more processors, each of the plurality of possible types for the input question to create a ranked list of possible types for the input question,
wherein the predetermined ontology includes a plurality of labeled nodes representing entities and their associated types,
wherein the labeled nodes within the predetermined ontology are restructured and reformatted into a series of vectors in Euclidean vector space to construct the type similarity matrix,
wherein each vector within the series of vectors conveys a predetermined type within the predetermined ontology,
wherein a location of each vector within the Euclidean vector space is used to determine a similarity score between the associated types of the labeled nodes within the predetermined ontology,
wherein the neural network performs matrix multiplication between the input question in vector form and the type similarity matrix to determine a plurality of possible types for the input question, and
wherein the plurality of possible types for the input question is refined utilizing a list of potential types for training data derived from the predetermined ontology.

11. The computer program product of claim 10, wherein the input question is converted into a vector by a bidirectional long short-term memory (LSTM) and a combination layer.

12. The computer program product of claim 10, wherein:
the input question includes a text string, and
the input question is converted into the vector form by a recurrent neural network (RNN).

13. The computer program product of claim 10, wherein each of a plurality of vectors are created within a Euclidean vector space to represent an associated type within the predetermined ontology, where a proximity of the vectors within the Euclidean vector space is associated with a similarity of the vectors.

14. The computer program product of claim 10, wherein the type similarity matrix is created utilizing a low rank decomposition method such as SVD on top of a co-occurrence matrix.

15. The computer program product of claim 12, wherein:
the neural network is trained utilizing a plurality of question/answer pairs, wherein each of the question/answer pairs includes a question string and an associated answer string, and
for each of the plurality of question/answer pairs, a type of the associated answer string is determined from the predetermined ontology and is assigned to the question string as its label to create a list of question/type pairs.

16. A system, comprising:
a processor; and
logic integrated with the processor, executable by the processor, or integrated with and executable by the processor, the logic being configured to:
convert, by a neural network, an input question into a vector form using trained word embeddings;
construct, by the neural network, a type similarity matrix using a predetermined ontology;
perform, by the neural network, matrix multiplication between the input question in vector form and the type similarity matrix to determine a plurality of possible types for the input question; and
score, by the neural network, each of the plurality of possible types for the input question to create a ranked list of possible types for the input question,
wherein the predetermined ontology includes a plurality of labeled nodes representing entities and their associated types,
wherein the labeled nodes within the predetermined ontology are restructured and reformatted into a series of vectors in Euclidean vector space to construct the type similarity matrix,
wherein each vector within the series of vectors conveys a predetermined type within the predetermined ontology,
wherein a location of each vector within the Euclidean vector space is used to determine a similarity score between the associated types of the labeled nodes within the predetermined ontology,
wherein the neural network performs matrix multiplication between the input question in vector form and the type similarity matrix to determine a plurality of possible types for the input question, and
wherein the plurality of possible types for the input question is refined utilizing a list of potential types for training data derived from the predetermined ontology.

* * * * *